United States Patent

Nakagawa et al.

[11] Patent Number: 5,825,655
[45] Date of Patent: Oct. 20, 1998

[54] NORMAL OPERATING CONDITION RESTORATION DEVICE

[75] Inventors: Hitoshi Nakagawa; Toshiaki Kondo; Tetsuya Ogawa; Takayuki Furukoshi, all of Osaka, Japan

[73] Assignee: Komatsu Ltd., Tokyo, Japan

[21] Appl. No.: 765,453

[22] PCT Filed: Jul. 31, 1995

[86] PCT No.: PCT/JP95/01521

§ 371 Date: Jan. 22, 1997

§ 102(e) Date: Jan. 22, 1997

[87] PCT Pub. No.: WO96/04109

PCT Pub. Date: Feb. 15, 1996

[30] Foreign Application Priority Data

Aug. 2, 1994 [JP] Japan ................................... 6-181563

[51] Int. Cl.$^6$ ................................ G06F 19/00; B25J 9/22
[52] U.S. Cl. ............................... 364/474.17; 364/474.31; 364/474.32; 364/474.34
[58] Field of Search ......................... 364/474.17, 474.34, 364/474.16, 474.28, 474.29, 474.32, 477.01, 477.06, 474.18, 474.31

[56] References Cited

U.S. PATENT DOCUMENTS

| | | | |
|---|---|---|---|
| 3,633,011 | 1/1972 | Baderman et al. | 364/474.34 |
| 3,986,010 | 10/1976 | Tankford et al. | 364/474.17 |
| 4,442,493 | 4/1984 | Wakai et al. | 364/474.17 |
| 4,451,892 | 5/1984 | McMurty | 364/474.34 |
| 4,468,741 | 8/1984 | Simonton | 364/474.34 |
| 4,748,570 | 5/1988 | Shochi et al. | 364/513 |
| 5,414,633 | 5/1995 | Chung | 364/474.32 |

FOREIGN PATENT DOCUMENTS

| | | |
|---|---|---|
| 61-131001 | 6/1986 | Japan. |
| 62-211705 | 9/1987 | Japan. |
| 62-278610 | 12/1987 | Japan. |
| 2-178808 | 7/1990 | Japan. |
| 4-236603 | 8/1992 | Japan. |
| 6-187025 | 7/1994 | Japan. |

*Primary Examiner*—Paul P. Gordon
*Attorney, Agent, or Firm*—Armstrong, Westerman, Hattori, McLeland & Naughton

[57] ABSTRACT

A normal operating condition restoration device which comprises: (a) taught point memory device for storing successive taught points that constitute a work line on which a tool travels in relation to a workpiece and storing taught points for retraction which are among the taught points constituting the work line and to which the tool can be retracted from the workpiece; (b) tool abnormality detecting device for detecting abnormal conditions which have occurred in the tool traveling on the work line relative to the workpiece; and (c) controlling device for performing control. Upon detection of occurrence of abnormal conditions in the tool by the tool abnormality detecting device, the tool is shifted from an abnormality occurring point to the nearest taught point for retraction, following back a path on the work line which the tool has already passed, according to point information stored in the taught point memory device so that the abnormal tool is retracted from the workpiece, and such that a new tool or repaired tool is then brought to the abnormality occurring point by way of the above path on the work line to be installed thereat.

5 Claims, 7 Drawing Sheets

FIG. 1

| READ-OUT POINT NUMBER N | TAUGHT POINT COORDINATES P | COMMAND CODE | RETRACTION FLAG | RETRACTION POINT COORDINATES Q | WELDING FLAG | COMPLETION FLAG |
|---|---|---|---|---|---|---|
| 1 | $P_1$ (X,Y,Z) | 0 | 0 | 0 | 0 | 0 |
| 2 | $P_2$ (X,Y,Z) | 3 | 1 | $Q_1$ (X,Y,Z) (=$P_1$(X,Y,Z)) | 0 | 0 |
| ... | ... | ... | ... | ... | ... | ... |
| m | $P_m$ (X,Y,Z) | 2 | 1 | $Q_i$ (X,Y,Z) | 0 | 0 |
| m+1 | $P_{m+1}$ (X,Y,Z) | 1 | 0 | 0 | 1 | 0 |
| m+2 | $P_{m+2}$ (X,Y,Z) | 1 | 0 | 0 | 1 | 0 |
| ... | ... | ... | ... | ... | ... | ... |
| m+n−1 | $P_{m+n-1}$ (X,Y,Z) | 4 | 1 | 0 | 1 | 0 |
| m+n | $P_{m+n}$ (X,Y,Z) | 2 | 1 | $Q_{i+j}$ (X,Y,Z) | 1 | 1 |

FIG. 2

| READING-OUT/WRITE-IN POINT NUMBER N | COORDINATES |
|---|---|
| 1 | |
| 2 | |
| 3 | |
| 4 | |
| ⋮ | |

NORMAL OPERATING CONDITION RESTORATION DEVICE

This application is a 35 U.S.C. 371 of PCT/JP95/01521 filed Jul. 31, 1995.

TECHNICAL FIELD

The present invention relates to a normal operating condition restoration device and more particularly to a self resetting technique well adapted for use in an industrial robot system, that enables restoration of the system's normal operating conditions by automatically replacing or repairing a tool when abnormal conditions occur within the tool being operated on the work line relative to a workpiece.

BACKGROUND ART

A known self resetting device is designed such that when abnormal conditions have occurred within a tool on a work line relative to a workpiece, the device repeatedly attempts to put the system in operation at the abnormality occurring point to resume the system's normal operating conditions and if the device succeeds, the system restarts its operation from the abnormality occurring point, regarding the abnormal conditions as having been eliminated.

Since the above device resets the system by trying to put the system in operation at the point where tool abnormalities have occurred, there are some cases in which the device cannot be reset by making such attempts, for example, when there arises a need to replace or repair the abnormal tool.

The present invention has been made in order to solve the above problem and therefore one of the objects of the invention is to provide a normal operating condition restoration device which enables an operating system to resume its normal operating conditions to restart operation from the abnormality occurring point, even when replacement or repairing of the abnormal tool is required.

DISCLOSURE OF THE INVENTION

The above object can be achieved by a normal operating condition restoration device according to the invention, which comprises:

(a) taught point memory means for storing successive taught points that constitute a work line on which a tool travels in relation to a workpiece and storing taught points for retraction which are among the taught points constituting the work line and to which the tool can be retracted from the workpiece;

(b) tool abnormality detecting means for detecting abnormal conditions which have occurred in the tool traveling on the work line relative to the workpiece; and (c) controlling means for performing control such that upon detection of occurrence of abnormal conditions in the tool by the tool abnormality detecting means, the tool is shifted from an abnormality occurring point to the nearest taught point for retraction, following back a path on the work line which the tool has already passed, according to point information stored in the taught point memory means so that the abnormal tool is retracted from the workpiece, and such that a new tool or repaired tool is then brought to the abnormality occurring point by way of the above path on the work line to be installed thereat.

According to the invention, when occurrence of abnormal conditions in a tool has been detected, the abnormal tool can be retracted from the workpiece, by shifting it from the abnormality occurring point to the nearest taught point for retraction, following back the path on the work line which it has already passed. After that, the abnormal tool is replaced with new one by means of a known automatic tool exchanger or repaired by means of a known automatic tool repairing machine, and the new or repaired tool is then put back to the abnormality occurring point by way of the same path that the abnormal tool has followed back for retraction from the workpiece.

Accordingly, even if there arises a need to replace an abnormal tool with new one or to repair the abnormal tool, the invention enables tool replacement or tool repairing without the interference of the workpiece to restart operation from the position where abnormal conditions have occurred.

The tool may be a welding torch or grinding wheel. The normal operating condition restoration device of the invention is preferably incorporated in an industrial robot system.

The tool replacement may be carried out with an automatic welding torch exchanger or automatic grinding wheel exchanger. The tool repairing may be carried out with an automatic welding torch repairing machine or automatic grinding wheel repairing machine.

Other objects of the present invention will become apparent from the detailed description given hereinafter. However, it should be understood that the detailed description and specific example, while indicating a preferred embodiment of the invention, are given by way of illustration only, since various changes and modifications within the spirit and scope of the invention will become apparent to those skilled in the art from this detailed description.

BEST MODE FOR CARRYING OUT THE INVENTION

Reference is now made to the accompanying drawings to describe one embodiment of the invention in which a normal operating condition restoration device is incorporated in an industrial welding robot system.

Figure 1:
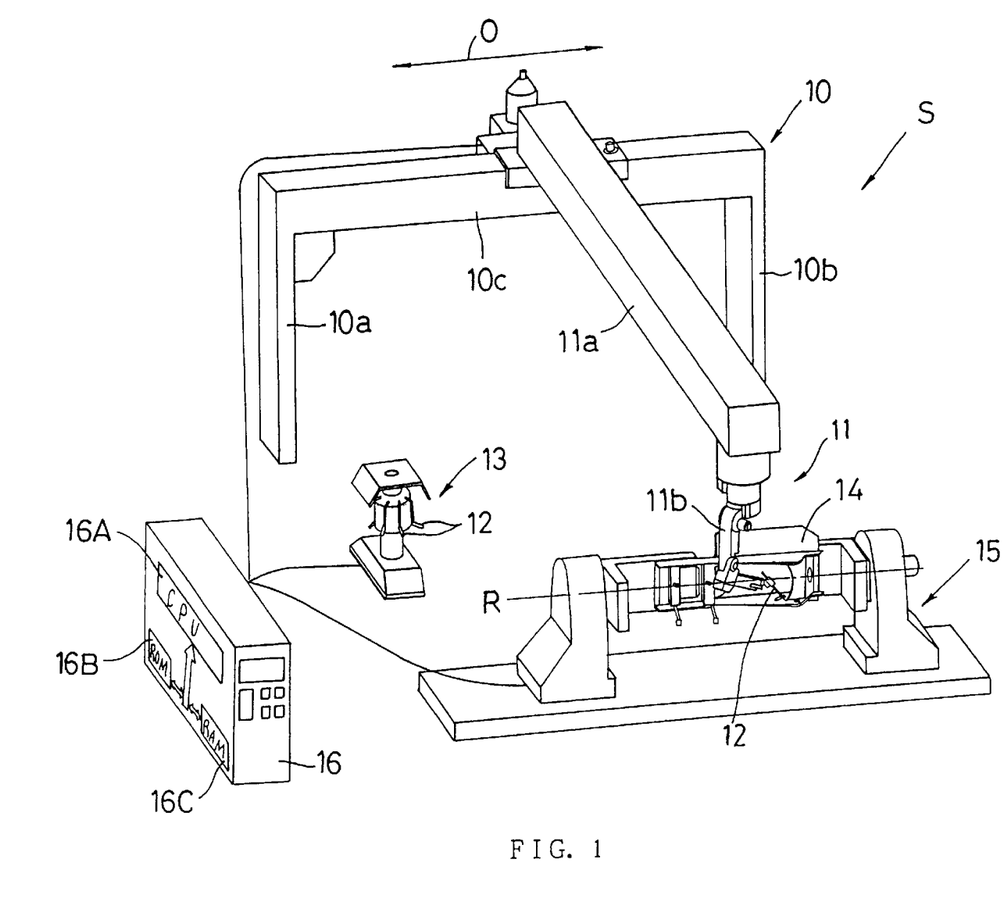
FIG. 1 schematically shows a whole industrial robot system for use in welding to which a normal operating condition restoration device according to an embodiment of the invention is applied.

FIG. 1 shows an industrial robot system S for use in welding operation. The system S includes a portal support 10 comprising a pair of legs 10a, 10b and a beam 10c transversely disposed between the legs 10a, 10b. An arm 11a strides, at one end thereof, over the beam 10c of the support 10 so as to be movable in the direction of O-axis along the beam 10c. The arm 11a holds, at the other end thereof, a welding torch 12 which suspends from the arm 11a so as to be removable therefrom. The system S also includes a six-axis type articulated robot 11 comprising an operating arm 11b that is able to carry out automatic replacement of the welding torch 12 and to allow the torch 12 to take various poses. The system S further includes an automatic welding torch exchanger 13 that houses a plurality of welding torches 12 to be used in the automatic replacement by the operating arm 11b of the robot 11, a workpiece 14 to be welded, and a two-axis positioner 15 for fixedly pinching a main frame of a revolving frame of a hydraulic shovel with the aid of a hydraulic mechanism such that the main frame can forwardly and backwardly incline and rotate about R-axis that is parallel to O-axis. The system S further includes a drive control unit 16 for performing various control operations such as: drive control for the robot 11 (more precisely, travel control of the robot 11 in the direction of O-axis and pose and position control of the operating arm 11a); drive control of the automatic welding torch exchanger 13; and rotation and inclination control of the two-axis positioner 15.

The drive control unit 16 is a micro computer composed of a central processing unit (CPU) 16A for executing specified programs for sequence control and operation control, a read only memory (ROM) 16B for storing the above programs, a random access memory (RAM) 16C in which working areas including various registers necessary for executing the programs and tables are set. The tables stored in the RAM 16C include a teaching table and a tracking controlled moving table that respectively comprise the following columns.

Figure 2:
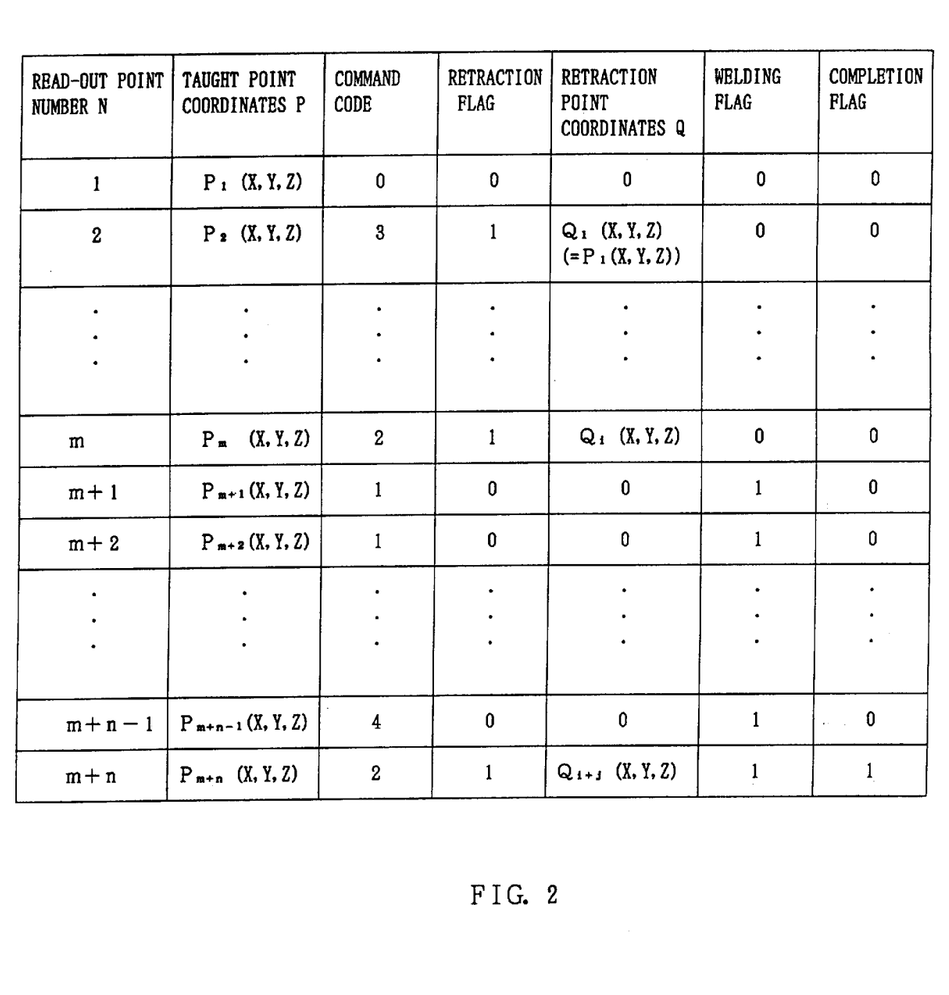
FIG. 2 shows a teaching table that appears in the description of FIG. 1.

(i) Teaching table (see FIG. 2)

(1) Taught point coordinates columns

In these columns, the respective coordinates of a series of taught points $P_1, P_2, \ldots, P_m, P_{m+1}, P_{m+2}, \ldots, P_{m+n-1}, P_{m+n}$ are stored so as to correspond to read-out point numbers M. The taught points determines a work line for the welding torch 12 relative to the workpiece 14.

(2) Command code columns

When shifting the welding torch 12 to a taught point $P_2, \ldots, P_m, P_{m+1}, P_{m+2}, \ldots, P_{m+n-1}, P_{m+n}$ from an adjacent taught point $P_1, \ldots, P_{m-1}, P_m, P_{m+1}, \ldots, P_{m+n-2}, P_{m+n-1}$ that is immediately before the former taught point on the work line, one of the following commands is selected: (a) tracking controlled moving represented by code "1": tracking controlled moving is carried out for example by roller tracking or arc sensor tracking (see Japanese Patent Laid Open Publication No. 59-110472 (1984)) without obtaining an interpolation point; (b) linear interpolation moving represented by code "2": the welding torch 12 is moved utilizing an interpolation point calculated by linear interpolation; (c) circular interpolation moving represented by code "3": the welding torch 12 is moved utilizing an interpolation point calculated by circular interpolation; and (d) curvilinear interpolation moving represented by code "4": the welding torch 12 is moved utilizing an interpolation point calculated by curvilinear interpolation. The command codes 1, 2, 3, 4 are stored correspondingly to the respective taught points $P_2, \ldots, P_m, P_{m+1}, P_{m+2}, \ldots, P_{m+n-1}, P_{m+n}$.

(3) Retraction flag columns

In these columns, retraction flags are stored correspondingly to the respective taught points $P_1, P_2, \ldots, P_m, P_{m+1}, P_{m+2}, \ldots, P_{m+n-1}, P_{m+n}$, which indicate whether each taught point is a point to which the welding torch 12 can be retracted without the interference of the workpiece 14, when retracting the welding torch 12 from the workpiece 14. The retraction flag "1" indicates a taught point to which the welding torch 12 is retractable while the retraction flag "0" indicates a point to which the torch 12 is not retractable.

(4) Retraction point coordinates columns

In these columns, the respective coordinates of retraction points $Q_1, \ldots, Q_i \ldots, Q_{i+j}$ are stored correspondingly to the retraction flag "1" which indicates "retractable". Each retraction point is a point outside the workpiece 14, to which the welding torch 12 is retracted from the workpiece 14.

(5) Welding flag columns

In these columns, welding flags are stored correspondingly to the respective taught points $P_2, \ldots, P_m, P_{m+1}, P_{m+2}, \ldots, P_{m+n-1}, P_{m+n}$, the flags representing whether welding is to be performed when shifting the welding torch 12 to a taught point $P_2, \ldots, P_m, P_{m+1}, P_{m+2}, \ldots, P_{m+n-1}, P_{m+n}$ from an adjacent taught point $P_1, \ldots, P_{m-1}, P_m, P_{m+1}, P_{m+n-2}, P_{m+n-1}$ that is immediately before the former taught point on the work line. The welding flag "1" indicates that welding is to be carried out, while the welding flag "0" indicates that welding is not to be carried out.

(6) Completion flag columns

These columns store completion flags that represent whether the operation of the welding torch 12 relative to the workpiece 14 has been completed. The completion flag "1" indicates completion of the operation while the completion flag "0" indicates that the operation has not been completed yet. More specifically, in this embodiment, the completion flag "0" is stored correspondingly to the respective taught points $P_1, P_2, \ldots, P_m, P_{m+1}, P_{m+2}, \ldots, P_{m+n-1}$ of the work line of the welding torch 12 relative to the workpiece 14, excluding the last taught point $P_{m+n}$, For the last taught point $P_{m+n}$, the completion flag 1 is stored.

Figure 3:
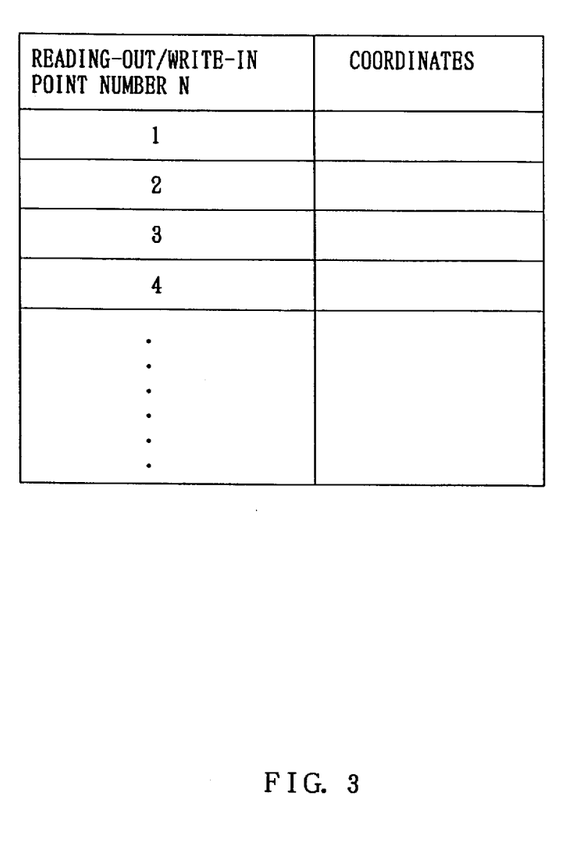
FIG. 3 shows a tracking controlled moving table that appears in the description of FIG. 1.

(ii) Copy moving table (see FIG. 3)

This table stores the coordinates of points which determine the path between two taught points when tracking controlled moving of the welding torch 12 is carried out with the command code stored in the command code column of the teaching table being "1". The coordinates of these points are stored sequentially in coordinates columns at specified time intervals in accordance with read-out/write-in point numbers N.

Figure 4:
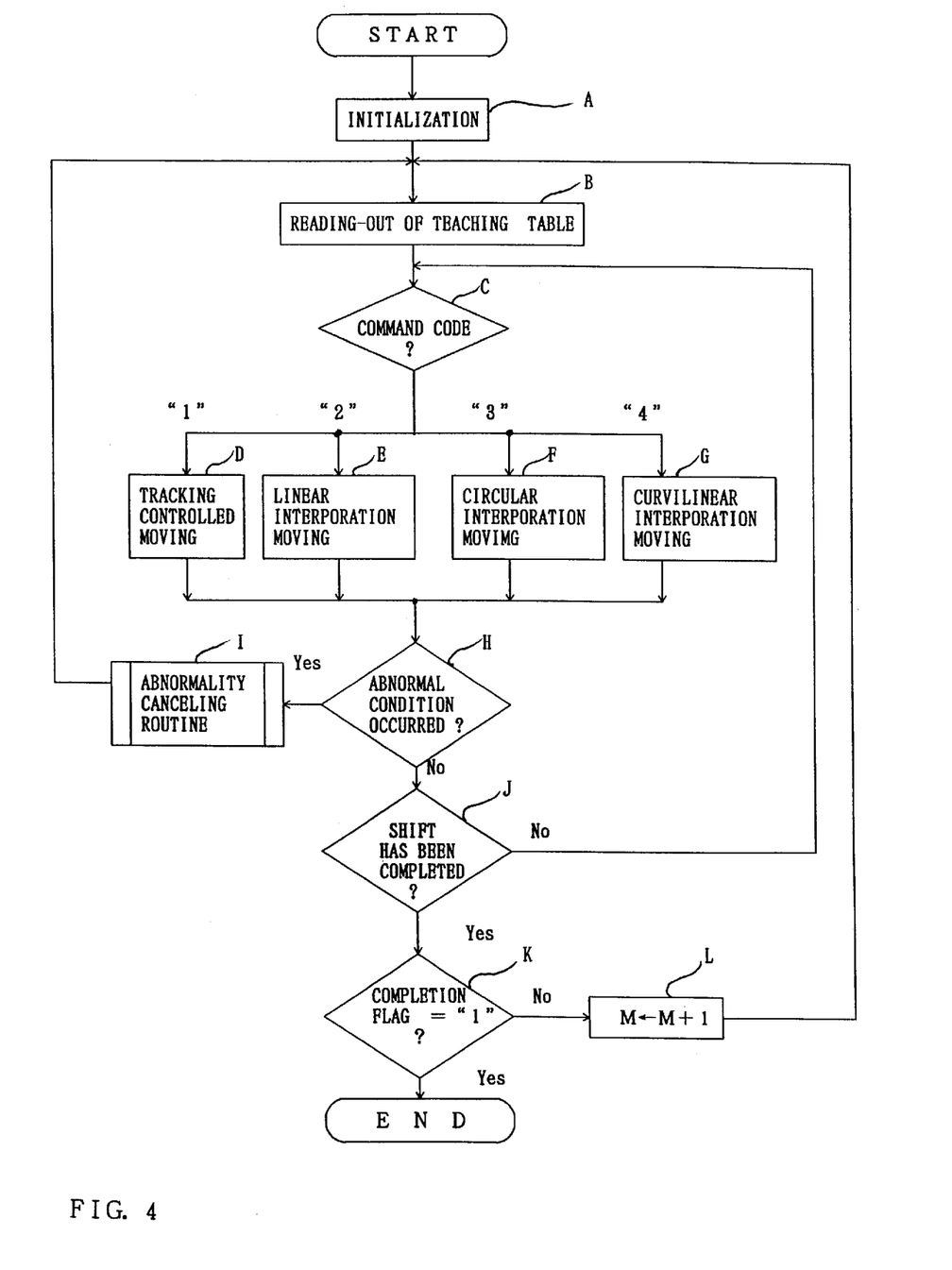
FIG. 4 is a flow chart of a program that appears in the description of FIG. 1.

Reference is made to the flow chart of FIG. 4 to explain the basic operation performed by effecting the specified program stored in the ROM 16B of the CPU 16A of the drive control unit 16.

A: The specified program is executed thereby to clear the contents of the registers in the RAM 16C and to perform initialization by respectively setting the read-out point number M of the teaching table and the read-out/write-in point number N of the tracking controlled moving table to 1.

B: Data are read out from the taught point coordinates column, command code column, retraction flag column, retraction point coordinates column, welding flag column and completion flag column of the teaching table, these respective columns corresponding to the present read-out point number M of the teaching table.

C to G: From the data read out from the command code column of the teaching table, it is determined which tracking controlled moving "1" (e.g., roller tracking), linear interpolation moving "2", circular interpolation moving "3" or curvilinear interpolation moving "4" is to be performed. These interpolation movings are carried out with the coordinates of an interpolation point obtained by linear, circular or curvilinear interpolation based on the coordinates of the present position of the welding torch 12 and the coordinates P of the taught point read out from the taught point coordinates column of the teaching table. If it is found from the above check that tracking controlled moving "1" is to be performed, the welding torch 12 is then shifted by tracking controlled moving such as roller tracking. If it is found that linear interpolation moving "2", circular interpolation moving "3" or curvilinear interpolation moving "4" is to be performed, the welding torch 12 is then shifted to the interpolation point obtained by linear, circular or curvilinear interpolation. During the shift of the welding torch 12, welding is carried out or is not carried out by the welding torch 12 depending on the data read out from the welding flag column of the teaching table, i.e., which welding flag "1" or "0" has been set ("1"=welding is to be performed, "0"=welding is not to be performed).

H: A check is made using a current sensor or the like to determine whether abnormal conditions have occurred because of extinction of the arc of the welding torch 12, when the welding flag "1" has been set so that welding is performed in the course of the shift of the welding torch 12 by tracking controlled moving or the shift to the interpolation point. If no abnormalities are sensed, the program proceeds to Step J and if abnormalities are sensed, the program proceeds to the next Step I.

I: Abnormality canceling routine: If abnormal conditions have occurred because of arc extinction, the welding torch 12 will be replaced with new one. Details will be described later with reference to the flow chart of FIG. 5(a)–5(b). After sweeping away the abnormal conditions, the program returns to Step B.

J to L: A check is made to determine whether the welding torch 12 has been shifted by tracking controlled moving or interpolation moving to the coordinates P of the taught point read out from the taught point coordinates column of the teaching table. In the case of tracking controlled moving, the coordinates of the present position of the welding torch 12 are written in the coordinates column of the tracking controlled moving, the column corresponding to the present read-out/write-in point number N. The present read-out/write-in point number N is incremented by "1" to provide a new read-out/write-in point number N.

Then, if it is determined that the shift has not been completed, the program returns to Step C. If the shift has been completed, a check is then made based on the data read out from the completion flag column of the teaching table, i.e., which completion flag "1" or "0" has been set ("1"= operation has been completed, "0"=operation has not been completed) to determine whether the operation has been completed. If the operation has been completed, the program is ended. If the operation has not been completed, the present read-out point number M of the teaching table is incremented by "1" to provide a new read-out point number M and the program returns to Step B.

Figure 5A:
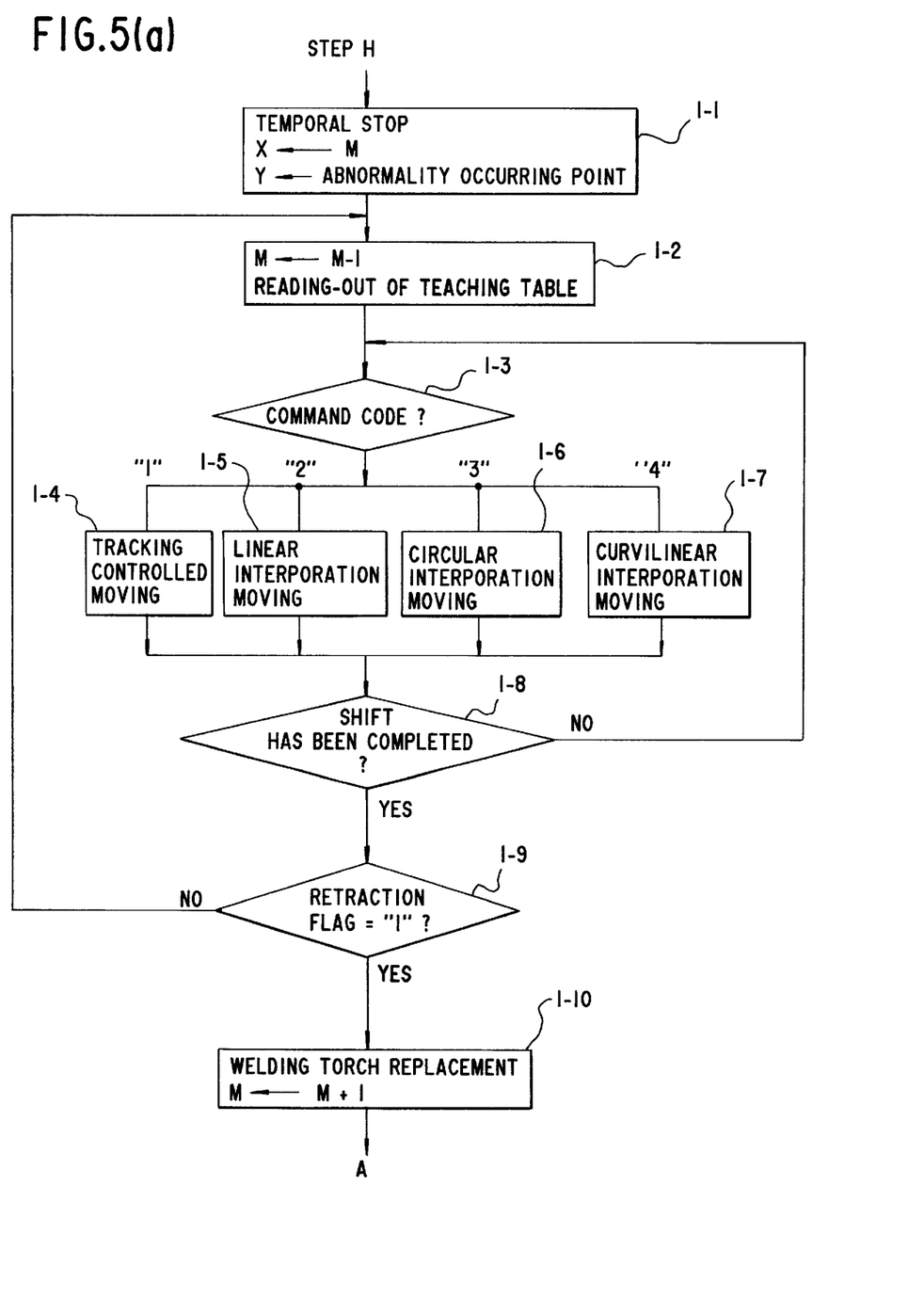
FIG. 5(a)–5(b) is a flow chart of an abnormality canceling routine that appears in the description of FIG. 4.
Figure 5B:
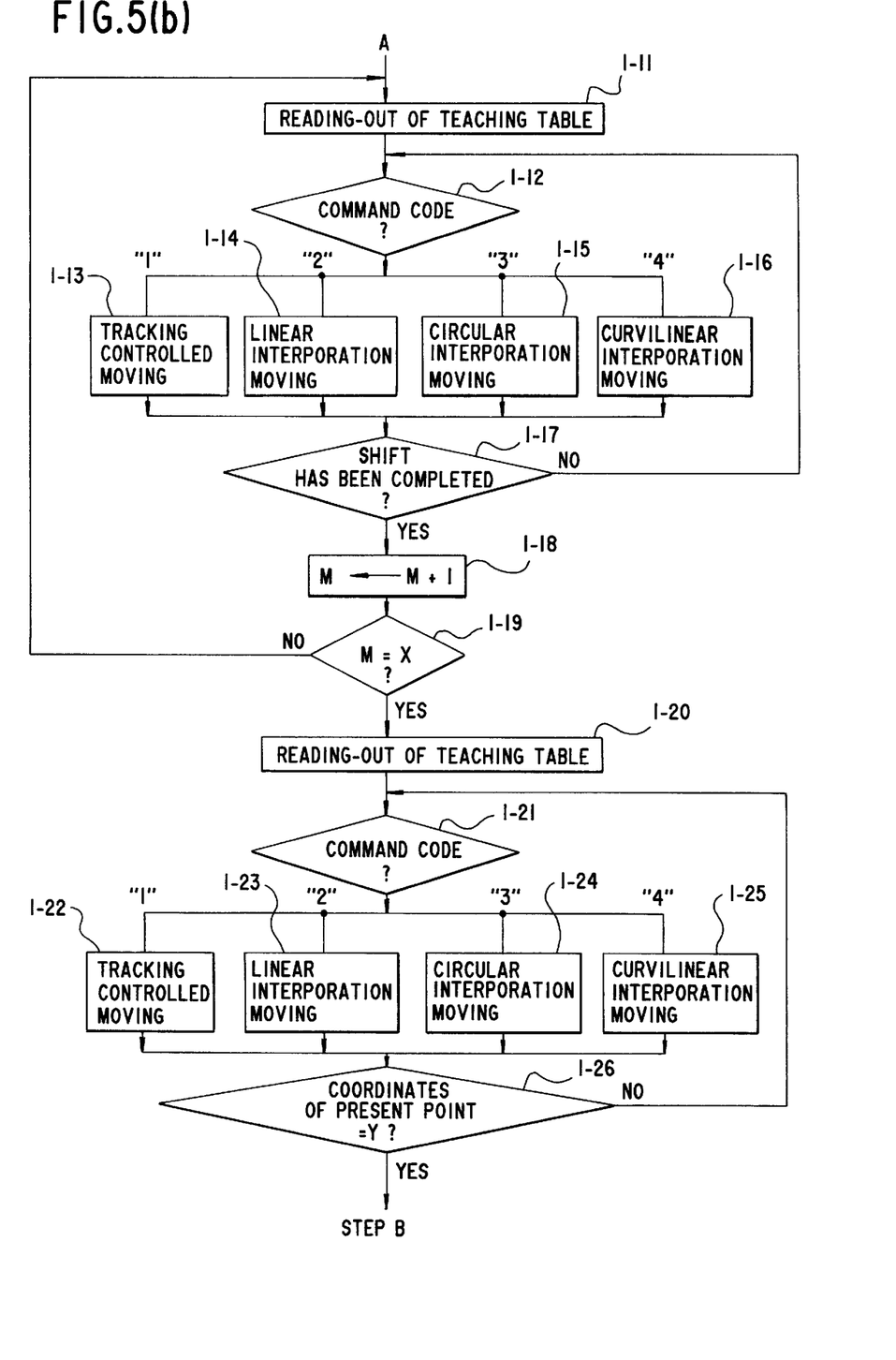

Last of all, the abnormality canceling routine (Step I) will be described below with reference to the flow chart of FIG. 5(a)–5(b).

(I-1) The movement of the welding torch 12 is temporarily stopped during the shift by tracking controlled moving or interpolation moving. If the welding torch 12 is in its welding state, welding is temporarily stopped. Further, the read-out point number M of the teaching table is read out to be set as temporal stored data X, while the coordinates of an abnormality occurring point $P_x$ at which the movement of the welding torch 12 has been temporarily stopped is set as temporal stored data Y.

During the abnormality canceling routine, welding by the welding torch 12 is temporarily interrupted irrespective of the data read out from the welding flag column of the teaching table.

(I-2) The present read-out point number M of the teaching table is decremented by "1" to provide a new read-out point number M. Similarly to Step B, the data of the taught point coordinates column and the command code column of the teaching table which correspond to the new read-out point number M are read out.

(I-3 to I-7) Similarly to Steps C to G, it is determined from the data read out from the command code column of the teaching table which tracking controlled moving "1", linear interpolation moving "2", circular interpolation moving "3" or curvilinear interpolation moving "4" is to be performed. If it is determined that tracking controlled moving "1" is to be performed, the coordinates of the point, which correspond to the present read-out/write-in point number N and are among those that have sequentially been written in the tracking controlled moving table during the previous shift of the welding torch 12 by tracking controlled moving such as roller tracking, are read out. Then, the welding torch 12 is shifted to the coordinates which have been read out. If it is determined that linear interpolation moving "2", circular interpolation moving "3" or curvilinear interpolation moving "4" is to be performed, the welding torch 12 is shifted to the coordinates of the interpolation point which has been obtained from linear, circular or curvilinear interpolation based on the coordinates P of the taught point read out from the taught point coordinates column of the teaching table and on the coordinates of the present position of the welding torch 12, in the similar way to that of Steps E to G.

(I-8, I-9) A check is made similarly to Step J to determine whether the shift of the welding torch 12 to the coordinates P of the taught point read out from the taught point coordinates column of the teaching table has been completed. In the mean time, in the case of tracking controlled moving "1", the present read-out/write-in point number N of the tracking controlled moving table is decremented by "1" to provide a new read-out/write-in point number N.

If it is found that the shift has not been completed yet, the program returns to Step I-3. On the other hand, if the shift has been completed, a check is then made based on the data read out from the retraction flag column of the teaching table, that is, which retraction flag "1" or "0" has been set ("1"=retractable, "0"=not retractable) to determine whether the welding torch 12 can be retracted from the workpiece 14. If the welding torch 12 is retractable, the program returns to Step I-2 and if it is not retractable, the program proceeds to Step I-10.

(I-10) The welding torch 12 is shifted to the coordinates Q of the retraction point read out from the retraction point coordinates column of the teaching table. Then, the welding torch 12 is further moved to the automatic welding torch exchanger 13 to be replaced by new one. After the replacement, the new welding torch 12 is shifted to the coordinates P of the taught point read out from the taught point coordinates column via the aforesaid coordinates Q of the retraction point read out from the retraction point coordinates column of the teaching table. Then, the present read-out point number M of the teaching table is incremented by "1" to provide a new read-out point number M.

Similarly to Steps B and I-2, the data of the taught point coordinates column and command code column of the teaching table which correspond to the present read-out point number M are read out.

(I-12, I-16) Based on the data read out from the command code column of the teaching table, a check is made similarly to Steps C to G and Steps I-3 to I-7 to determine which tracking controlled moving "1", linear interpolation moving "2", circular interpolation moving "3" or curvilinear interpolation moving "4" 1 is to be performed. If it is found that tracking controlled moving "1" is to be performed, the coordinates stored in the coordinates column of the tracking controlled moving table, which correspond to the present read-out/write-in point number N of the tracking controlled moving table, are read out. Then, the welding torch 12 is shifted to the above read-out coordinates. If it is found that linear interpolation moving "2", circular interpolation moving "3" or curvilinear interpolation moving "4" is to be performed, the welding torch 12 is then shifted to the coordinates of the interpolation point which is obtained from linear, circular or curvilinear interpolation, similarly to Steps E to G and Steps I-5 to I-7.

(I-17, I-20) Similarly to Steps J and I-8, a check is made to determine whether the shift of the welding torch 12 to the coordinates P of the taught point read out from the taught point coordinates column of the teaching table has been completed. In the mean time, if tracking controlled moving "1" is indicated, the present read-out/write-in point number N of the tracking controlled moving table is incremented by "1" to provide a new read-out/write-in point number N. If it is determined that the shift has not been completed, the program proceeds to Step I-12. On the other hand, if the shift has been completed, the present read-out point number M of the teaching table is incremented by "1" to provide a new read-out point number M. Thereafter, a check is made to determine whether the new read-out point number M coincides with the contents of the temporal stored data X. If it does not coincide, the program returns to Step I-11. If it coincides, the data of the taught point coordinates column and the command code column of the teaching table which correspond to the read-out point number M, are read out similarly to Steps B and I-2.

(I-21 to I-26) Similarly to Steps I-12 to I-16, a check is made to determine which tracking controlled moving "1", linear interpolation moving "2", circular interpolation moving "3" or curvilinear interpolation moving "4" is to be performed, and according to the check, the welding torch 12 is shifted. After the welding torch 12 has been shifted, it is judged whether the coordinates of the present position of the welding torch 12 coincides with the coordinates of the abnormality occurring point stored as the temporal stored data Y If not, the program returns to Step I-21. If so, the program returns to Step B.

Figure 6:
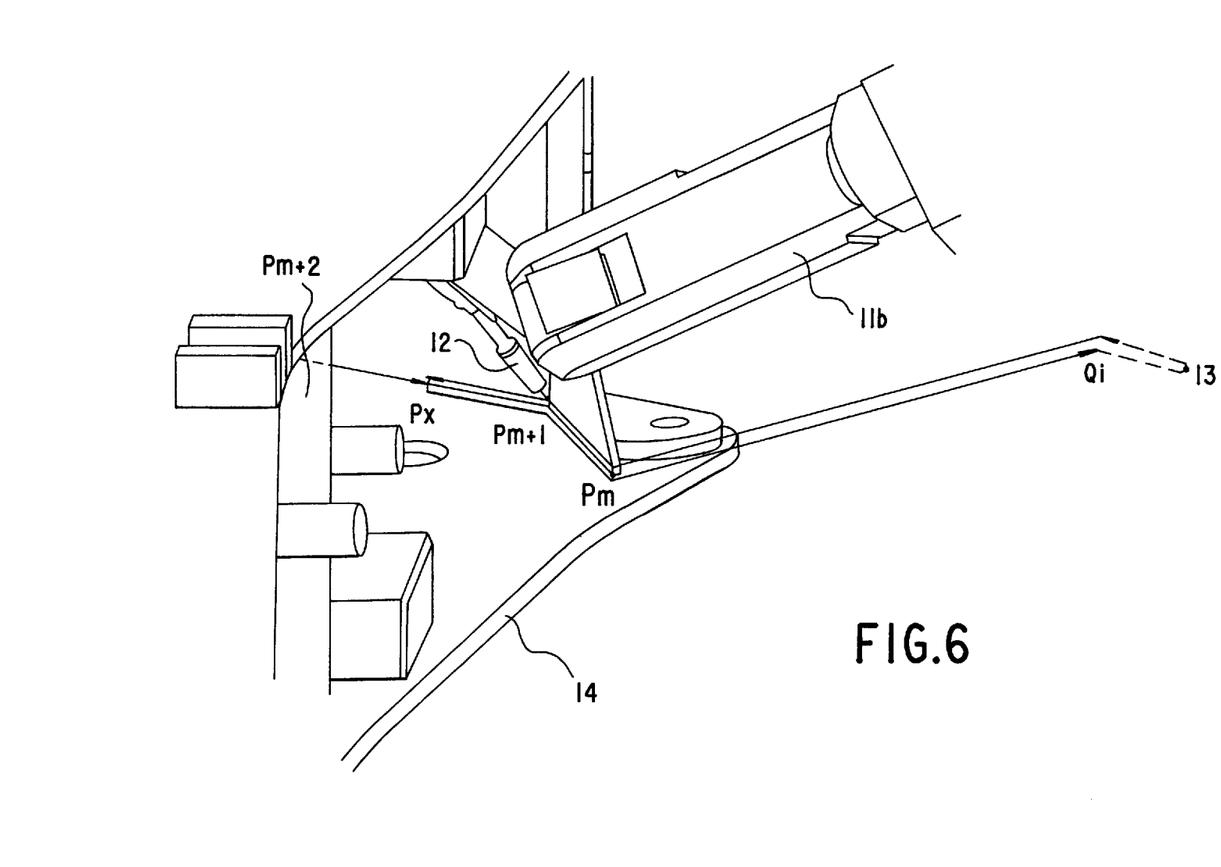
FIG. 6 illustrates one embodiment of process performed according to the program shown in the flow chart of FIG. 5(a)–5(b), using the teaching table of FIG. 2.

Referring to FIG. 6, the above described abnormality canceling routine (Step I) will be concretely described, taking the case of the teaching table shown in FIG. 2 for example. Suppose that the welding torch 12 has started welding from a taught point $P_m$ and while the welding torch 12 is proceeding to a taught point $P_{m+2}$ passing a taught point $P_{m+1}$, the arc of the welding torch 12 goes out so that the travel of the welding torch 12 comes to a temporal stop. The point at which the welding torch 12 temporarily stops is set as the abnormality occurring point $P_x$.

While welding by the welding torch 12 being temporarily brought to a stop, the welding torch 12 moves back from the abnormality occurring point $P_x$ to the taught point $P_m$ for which the retraction flag "1" indicating "retractable" has been set, by way of the path of the work line as indicated by arrow in FIG. 6 which the welding torch 12 has once passed. The welding torch 12 is then shifted from the taught point $P_m$ to a retraction point $Q_j$, thereby retracting the welding torch 12 from the workpiece 14.

Thereafter, the welding torch 12 is replaced with new one by means of the automatic welding torch exchanger 13 as described before and the new welding torch 12 is then moved to the abnormality occurring point $P_x$ via the retraction point $Q_1$, taught point $P_m$ and taught point $P_{m+1}$ on the path which the welding torch 12 has taken when being retracted from the workpiece 14.

In this embodiment, the welding torch 12 temporarily stops at the abnormality occurring point $P_x$ as the arc goes out and the abnormality canceling routine (Step I) is immediately performed at that point $P_x$ to replace the welding torch 12 without trying to restart the operation. However, the program may be arranged such that an attempt to restart the operation is repeatedly made at the abnormality occurring point $P_x$ and if the operation cannot be restarted, the abnormality canceling routine (Step I) is performed.

While the abnormal welding torch 12 suffering from arc extinction is replaced with new one in the abnormality canceling routine (Step I) in the foregoing embodiment, the abnormal welding torch 12 may be repaired instead of replacement, by removing spatter from the welding torch 12 with a nozzle cleaner which serves as an automatic welding torch repairing machine or by cutting a wire with a wire cutter which also serves as an automatic welding torch repairing machine thereby to eliminate the cause of arc extinction. It should be noted that an explanation on pose control of the welding torch 12 is omitted from the foregoing embodiment.

Although the foregoing embodiment does not particularly mention the case where it becomes necessary to shift the coordinates of taught points because of a shift of the workpiece 14, if such a case happens, coordinate transformation should be carried out.

While the foregoing embodiment has particularly been described with a case where the normal operation restoration device of the invention is installed in an industrial welding robot system, it may be applied to other systems such as an industrial robot system for use in grinding operation that has a grinding wheel as the tool and an automatic grinding wheel exchanger. In cases where the invention is applied to the industrial grinding robot system, the automatic grinding wheel repairing machine may be a dresser for shaping or dressing a grinding wheel. Detection of occurrence of abnormal conditions such as excessive wear or clogging may be performed by detecting the load current of a motor for rotating the grinding wheel with a current sensor.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A normal operating condition restoration device, comprising:

(a) taught point memory means for storing successive taught points that constitute a work line on which a tool travels in relation to a workpiece and storing taught points for retraction which are among said taught points included in the work line and to which the tool can be retracted from the workpiece;

(b) tool abnormality detecting means for detecting abnormal conditions which have occurred in the tool traveling on the work line relative to the workpiece wherein the work line is a path along which the tool travels, in relation to the workpiece, from a point on the workpiece in which the tool begins work on the workpiece to another point on the workpiece in which tool abnormality is detected by the tool abnormality detecting means;

(c) controlling means for performing control such that upon detection of occurrence of abnormal conditions in the tool by the tool abnormality detecting means, the tool is shifted from an abnormality occurring point to the nearest taught point for retraction, following back a path on the work line which the tool has already passed, according to point information stored in the taught point memory means so that the abnormal tool is retracted from the workpiece, and such that a new tool or repaired tool is then brought to the abnormality occurring point by way of said path on the work line to be installed thereat.

2. A normal operating condition restoration device according to claim 1, wherein said tool is a welding torch or grinding wheel.

3. A normal operating condition restoration device according to claim 2, wherein replacement of said tool is carried out by an automatic welding torch exchanger or automatic grinding wheel exchanger.

4. A normal operating condition restoration device according to claim 2, wherein repairing of said tool is carried out by an automatic welding torch repairing machine or automatic grinding wheel repairing machine.

5. A normal operating condition restoration device according to claim 1 or 2 which is incorporated in an industrial robot system.

* * * * *